United States Patent
Christodorescu et al.

(10) Patent No.: US 9,491,078 B2
(45) Date of Patent: *Nov. 8, 2016

(54) IDENTIFICATION AND CLASSIFICATION OF WEB TRAFFIC INSIDE ENCRYPTED NETWORK TUNNELS

(71) Applicant: INTERNATIONAL BUSINESS MACHINES CORPORATION, Armonk, NY (US)

(72) Inventors: Mihai Christodorescu, Briarcliff Manor, NY (US); Xin Hu, White Plains, NY (US); Douglas L. Schales, Ardsley, NY (US); Reiner Sailer, Scarsdale, NY (US); Marc Ph. Stoecklin, Bern (CH); Ting Wang, Elmsford, NY (US); Andrew M. White, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,139

(22) Filed: Jun. 26, 2015

(65) Prior Publication Data

US 2015/0295805 A1  Oct. 15, 2015

Related U.S. Application Data

(63) Continuation of application No. 14/025,098, filed on Sep. 12, 2013, now Pat. No. 9,100,309, which is a continuation of application No. 13/862,601, filed on Apr. 15, 2013, now Pat. No. 9,106,536.

(51) Int. Cl.
*H04L 12/26* (2006.01)
*G06N 5/02* (2006.01)
(Continued)

(52) U.S. Cl.
CPC .......... *H04L 43/0876* (2013.01); *G06N 5/003* (2013.01); *G06N 5/022* (2013.01);
(Continued)

(58) Field of Classification Search
CPC .............. H04L 12/26; H04L 63/1408; H04L 63/1416; H04L 63/1425; H04L 63/1441; H04L 63/145; H04L 63/1483; H04L 67/34; H04L 67/306; H04L 67/325; H04L 67/10; H04L 67/327; G06F 9/505; G06F 21/55; G06F 21/577; G06F 15/16; G06N 3/0472; G06N 5/02; G06N 99/00; G06N 5/022; G06N 99/005; G06N 5/003; G06Q 10/107
USPC ............ 713/160; 726/22-26; 348/77, 222.1; 709/224

See application file for complete search history.

(56) References Cited

U.S. PATENT DOCUMENTS 7,653,186 B2   1/2010  Hosain et al.
8,140,421 B1   3/2012  Humphries et al.
(Continued)

FOREIGN PATENT DOCUMENTS

EP   2053783 A1   4/2009

OTHER PUBLICATIONS

Jun et al., "Identifying Skype Traffic by Random Forest," Communications and Networking in China, CHINACOM '07, Aug. 2007, pp. 2841-2844.
(Continued)

*Primary Examiner* — Thanhnga B Truong
(74) *Attorney, Agent, or Firm* — Tutunjian & Bitetto, P.C.; Jeff Labaw (57) ABSTRACT

The present principles are directed to identifying and classifying web traffic inside encrypted network tunnels. A method includes analyzing network traffic of unencrypted data packets to detect packet traffic, timing, and size patterns. The detected packet, timing, and size traffic patterns are correlated to at least a packet destination and a packet source of the unencrypted data packets to create at least one of a training corpus and a model built from the training corpus. The at least one of the corpus and model is stored in a memory device. Packet traffic, timing, and size patterns of encrypted data packets are observed. The observed packet traffic, timing, and size patterns of the encrypted data packets are compared to at least one of the training corpus and the model to classify the encrypted data packets with respect to at least one of a predicted network host and predicted path information.

8 Claims, 4 Drawing Sheets

(51) Int. Cl.
*H04L 29/06* (2006.01)
*G06N 5/00* (2006.01)
*G06N 99/00* (2010.01)
*H04L 12/24* (2006.01)

(52) U.S. Cl.
CPC ......... *G06N 99/005* (2013.01); *H04L 41/142* (2013.01); *H04L 41/147* (2013.01); *H04L 41/16* (2013.01); *H04L 43/04* (2013.01); *H04L 63/029* (2013.01); *H04L 63/1408* (2013.01)

(56) References Cited

U.S. PATENT DOCUMENTS

| | | | | |
|---|---|---|---|---|
| 8,224,905 | B2* | 7/2012 | Bocharov | G06Q 10/107 709/206 |
| 8,402,540 | B2* | 3/2013 | Kapoor | G06F 9/505 709/224 |

| | | | |
|---|---|---|---|
| 2008/0270120 | A1 | 10/2008 | Pestian et al. |
| 2010/0250918 | A1 | 9/2010 | Tremblay et al. |
| 2012/0042164 | A1 | 2/2012 | Gagnon et al. |

OTHER PUBLICATIONS

Jun et al., "Internet Traffic Classification Using Machine Learning," Communications and Networking in China, CHINACOM '07, Aug. 2007. (5 pages).

Wang et al., "Supervised Learning Real-time Traffic Classifiers," Journal of Networks, vol. 4, No. 7, Sep. 2009, pp. 622-629.

Tavallaee et al., "Online Classification of Network Flows," 2009 Seventh Annual Communications Networks and Services Research Conference, May 2009, pp. 78-85.

Lucerna et al., "Using per-Host Measurements for Fast Internet Traffic Classification," GTTI. Riunione annuale 2010, Jun. 2012, pp. 1-7.

\* cited by examiner

IDENTIFICATION AND CLASSIFICATION OF WEB TRAFFIC INSIDE ENCRYPTED NETWORK TUNNELS

RELATED APPLICATION INFORMATION

This application is a Continuation application of co-pending U.S. patent application Ser. No. 14/025,098, filed on Sep. 12, 2013, which, in turn, is a Continuation application of co-pending U.S. patent application Ser. No. 13/862,601, filed on Apr. 15, 2013, incorporated herein by reference in their entireties.

BACKGROUND

1. Technical Field

The present invention relates generally to encryption and, in particular, to the identification and classification of web traffic inside encrypted network tunnels.

2. Description of the Related Art

Web traffic that is tunneled via an encrypted connection is "invisible" to standard network intrusion and analysis tools. Thus, a method and system are needed to identify and classify web traffic inside encrypted tunnels.

SUMMARY

According to an aspect of the present principles, there is provided a method. The method includes analyzing network traffic of unencrypted data packets to detect packet traffic patterns, packet timing patterns, and packet size patterns therein. The method further includes correlating the detected packet traffic patterns, the detected packet timing patterns, and the detected packet size patterns to at least a packet destination and a packet source of the unencrypted data packets to create at least one of a training corpus and a model built from the training corpus. The method also includes storing the at least one of the training corpus and the model in a memory device. The method additionally includes observing packet traffic patterns, packet timing patterns, and packet size patterns of encrypted data packets. The method moreover includes comparing the observed packet traffic patterns, the observed packet timing patterns, and the observed packet size patterns of the encrypted data packets to at least one of the training corpus and the model to classify the encrypted data packets with respect to at least one of a predicted network host and predicted path information for the encrypted data packets.

According to another aspect of the present principles, there is provided a system. The system includes a feature extractor for analyzing network traffic of unencrypted data packets to detect packet traffic patterns, packet timing patterns, and packet size patterns therein. The system further includes a modeling engine for correlating the detected packet traffic patterns, the detected packet timing patterns, and the detected packet size patterns to at least a packet destination and a packet source of the unencrypted data packets to create at least one of a training corpus and a model built from the training corpus. The system also include a memory for storing the at least one of the training corpus and the model. The feature generator observes packet traffic patterns, packet timing patterns, and packet size patterns of encrypted data packets. The system additionally includes a prediction engine for comparing the observed packet traffic patterns, the observed packet timing patterns, and the observed packet size patterns of the encrypted data packets to at least one of the training corpus and the model to classify the encrypted data packets with respect to at least one of a predicted network host and predicted path information for the encrypted data packets.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to the identification and classification of web traffic inside encrypted network tunnels.

In an embodiment, the present invention identifies the website names that are visited via an encrypted connection.

In an embodiment, the present invention uses data from passively observed network traffic to identify packets that were sent and received from the same website. The present invention does not require knowledge of the cryptographic key used in the encrypted connection. Being able to passively observe traffic enables centralized filtering of encrypted web traffic. Without the present invention, individual filters will need to be installed to inspect and filter web traffic on the client devices before the web traffic is encrypted, which is non-scalable solution that is disruptive to the user experience.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
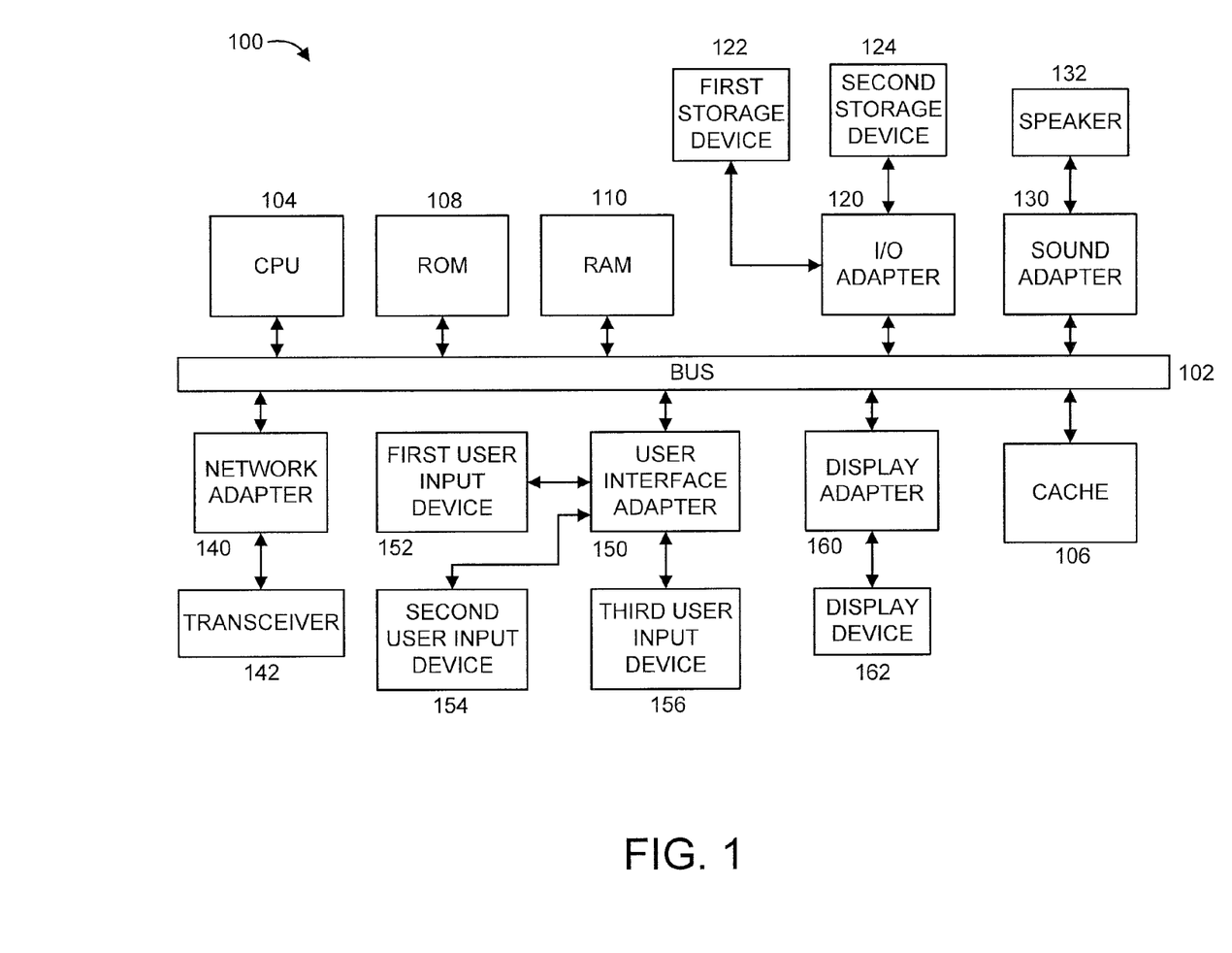
FIG. 1 shows an exemplary processing system 100 to which the present invention can be applied, in accordance with an embodiment of the present invention.

FIG. 1 shows an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O)

adapter 120, a sound adapter 130, a network adapter 140, a user interface adapter 150, and a display adapter 160, are operatively coupled to the system bus 104.

A first storage device 122 and a second storage device 124 are operatively coupled to system bus 104 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 104 by the sound adapter 130.

A transceiver 142 is operatively coupled to system bus 104 by network adapter 140.

A first user input device 152, a second user input device 154, and a third user input device 156 are operatively coupled to system bus 104 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152 and 154 can be the same type of user input device or different types of user input devices. The user input devices 152 and 154 are used to input and output information to and from system 100.

A display device 162 is operatively coupled to system bus 104 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
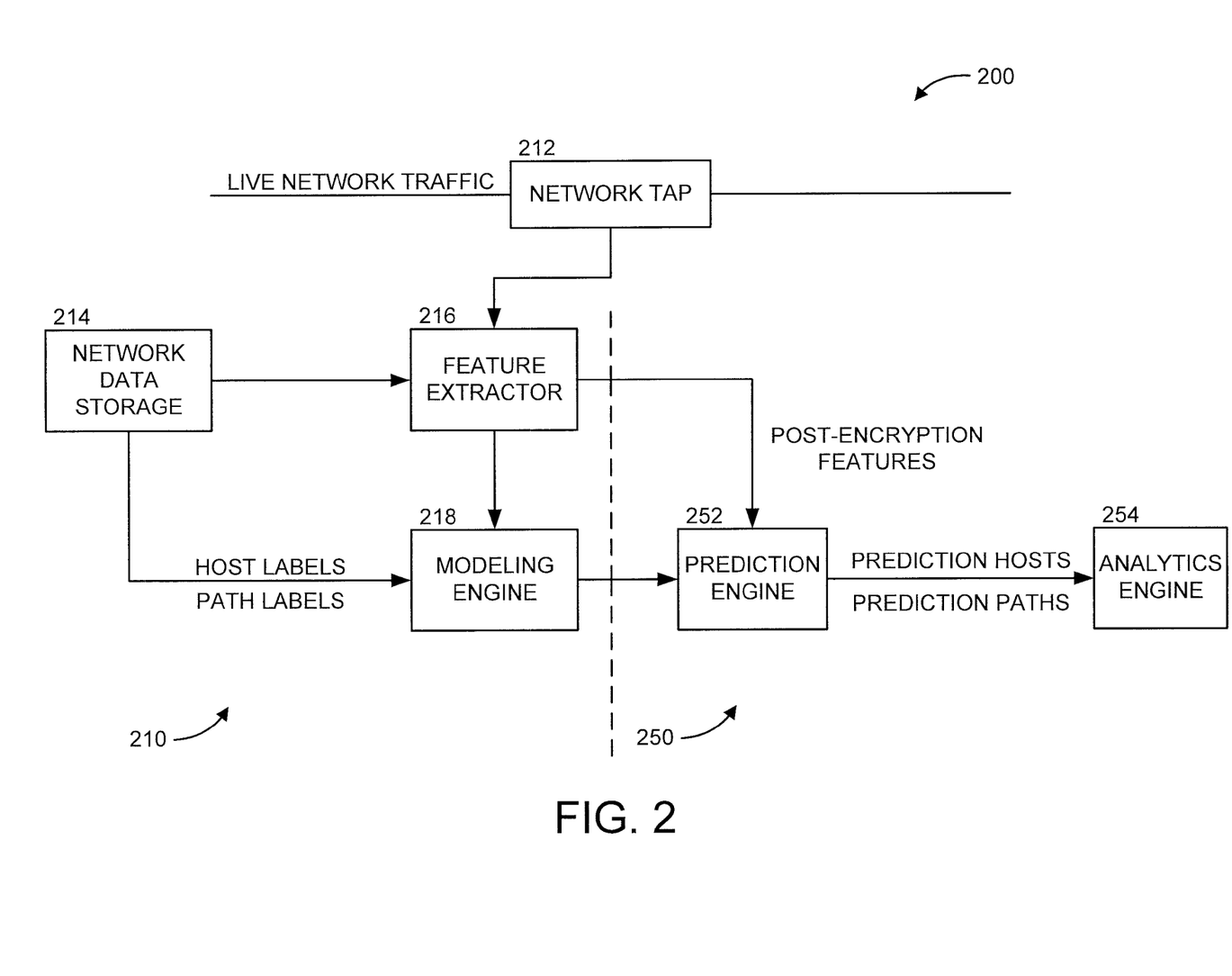
FIG. 2 shows an exemplary system 200 for identifying and classifying web traffic inside encrypted network tunnels, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
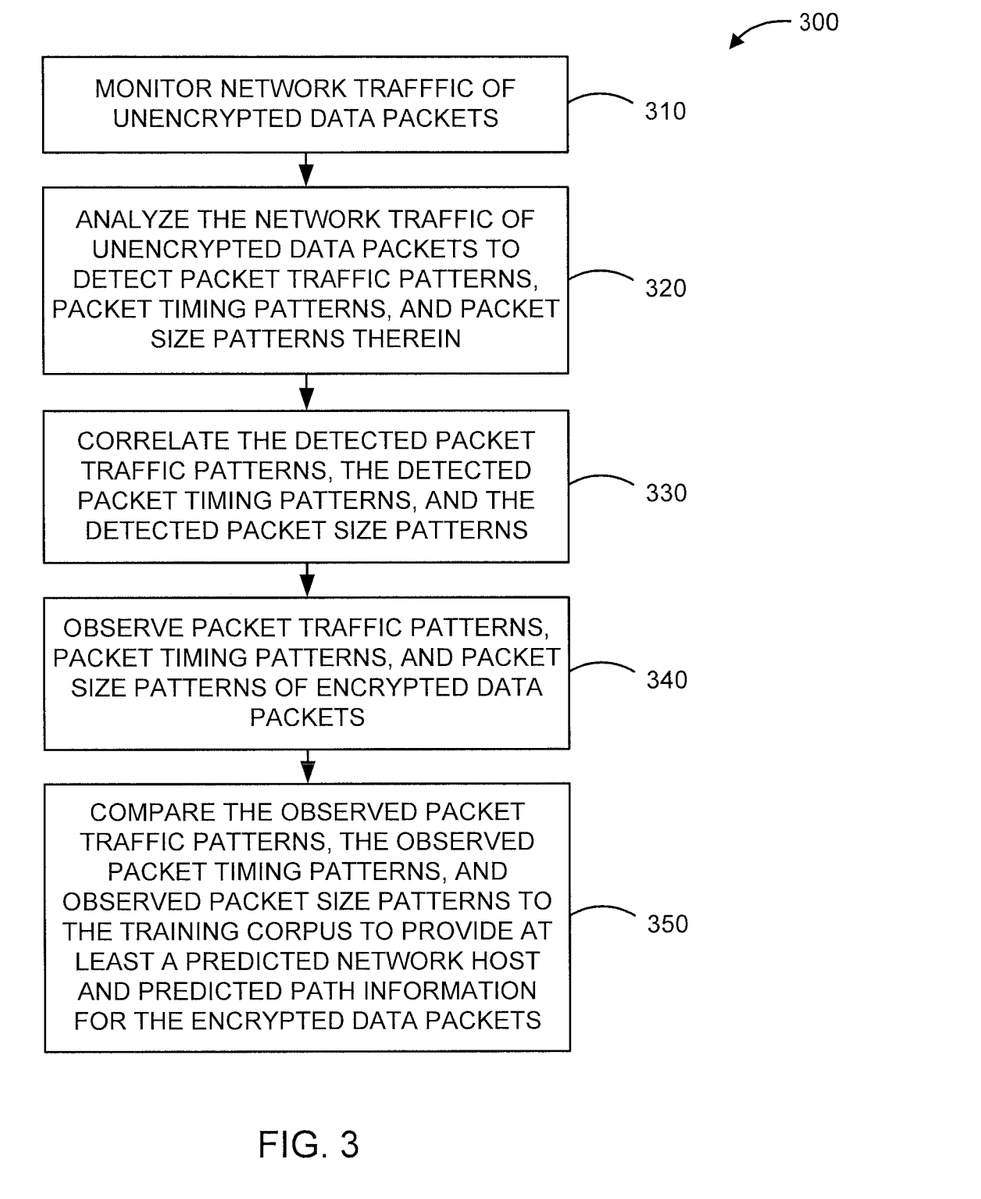
FIG. 3 shows an exemplary method 300 for identifying and classifying web traffic inside encrypted network tunnels, in accordance with an embodiment of the present invention.
Figure 4:
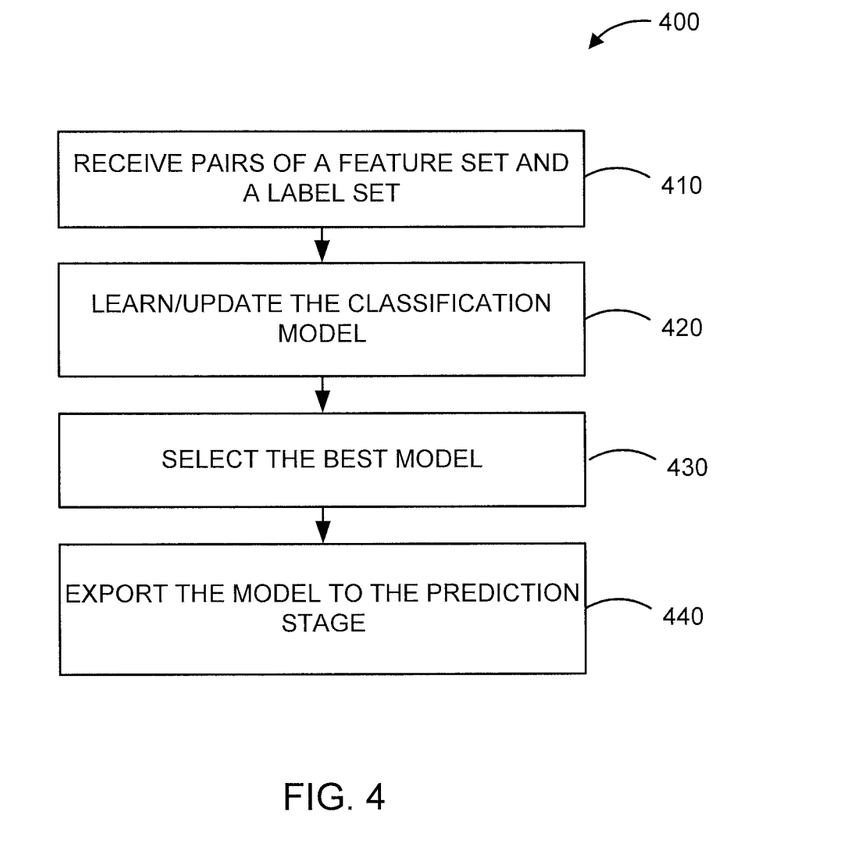
FIG. 4 shows an exemplary method 400 for modeling network traffic to identify and classify web traffic inside encrypted network tunnels, in accordance with an embodiment of the present invention.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

FIG. 2 shows an exemplary system 200 for identifying and classifying web traffic inside encrypted network tunnels, in accordance with an embodiment of the present invention. The system 200 includes a network tap 212, a network data storage system 214, a feature extractor 216, a modeling engine 218, a prediction engine 252, and an analytics engine 254.

In an embodiment, the system 200 can be considered to include a training stage 210 and a prediction stage 250. In the embodiment, the training stage 210 involves and/or otherwise includes a network tap 212 and/or a network data storage system 214, a feature extractor 216, and a modeling engine 218. That is, the training stage can include one or both of the network tap 212 and the network data storage system 214, depending upon if the training corpus is built with pre-stored or live network traffic. If live network traffic is used to build to the corpus, then the feature extractor 216 can also extract labels as described herein. In the embodiment, the prediction stage 250 includes the network tap 212, the feature extractor 216, a prediction engine 252 and an analytics engine 254.

The network tap 212 connects to a network to allow monitoring of live network traffic.

The network data storage system 214 stores network traffic. The network data storage system 214 can also store host labels and path labels for the stored network traffic. The network storage system 214 can provide a label set for the stored network traffic to the modeling engine 218. In principle, the network data storage system 214 can store raw network data (in which case the feature extractor 216 is applied to extract the relevant features and labels) and/or can store "summaries" of network data (in which case the host/path labels, and even the relevant features, have been previously extracted and thus may be passed directly to the modeling engine 218, bypassing the feature extractor 216). The prediction engine 252 can also be applied directly to stored network data, in the latter case.

The feature extractor 216 extracts features (e.g., packet size, timing, and direction) from the stored network traffic to provide a feature set therefor. The feature extractor 216 can also extract post-encryption features (e.g., packet size, timing, and direction) from the monitored (i.e., live) network traffic to provide a feature set therefor. The feature extractor 216 can also extract labels, for example, when building the training corpus using live network traffic; in such a case, the network data storage system 214 does not have to provide the labels since the labels will be provided by the feature extractor 216.

The modeling engine 218 trains a model to classify feature instances based on their label sets. In an embodiment, the model is a random forest model.

The prediction engine 252 applies the model to new data (e.g., live encrypted network traffic) and/or the stored data (e.g., stored network traffic) to output predictions therefor. That is, for each set of features (e.g., post-encryption features and/or unencrypted features) for HTTP request/response pairs, the prediction engine 252 applies the model trained in the training stage to provide a set of predicted labels.

The analytics engine 254 analyzes the set of predicted labels to provide a predicted host name and predicted path information for each HTTP request/response pair.

FIG. 3 shows an exemplary method 300 for identifying and classifying web traffic inside encrypted network tunnels, in accordance with an embodiment of the present invention.

At step 310, network traffic of unencrypted data packets is monitored over a time period.

At step 320, the network traffic of unencrypted data packets is analyzed to detect packet traffic patterns, packet timing patterns, and packet size patterns therein.

At step 330, the detected packet traffic patterns, the detected packet timing patterns, and the detected packet size patterns are correlated to at least a packet destination and a packet source of the unencrypted data packets to create at least one of a training corpus. In an embodiment, the detected packet traffic patterns, the detected packet timing patterns, and the detected packet size patterns can also be correlated to packet contents.

At step 340, packet traffic patterns, packet timing patterns, and packet size patterns of encrypted data packets are observed.

At step 350, the observed packet traffic patterns, the observed packet timing patterns, and the observed packet size patterns of the encrypted data packets are compared to the training corpus to provide at least one of a predicted network host and predicted path information for the encrypted data packets. While step 350 is described with respect to live network traffic, it is to be appreciated that the predictions can also (or in place of) be made with respect to the stored network traffic (e.g., the detected packet traffic patterns, the detected packet timing patterns, and the detected packet size patterns).

FIG. 4 shows an exemplary method 400 for modeling network traffic to identify and classify web traffic inside encrypted network tunnels, in accordance with an embodiment of the present invention.

At step 410, pairs of a feature set and a label set are received.

At step 420, the classification model is learned/updated.

At step 430, the best model is selected. For example, the best model can be selected based on certain predetermined criteria.

At step 440, the model is exported to the prediction stage.

One weak spot for network security and forensic analysis is encrypted streams. Since the data included in these streams is generally obscured from the viewpoint of network monitors, many standard network security, analytics, and forensic techniques cannot be applied to encrypted traffic. However, as networked communications are a necessarily complex system, information about encrypted connections is often leaked in the form of various side channels, in particular, by the timing, size, and direction of individual packets. We propose techniques for deriving information relevant for security analysis from these side channels. Depending on the network layer at which the encryption is applied, connection endpoint, routing, size and duration information may also be available. However, in an embodiment, we propose techniques for deriving relevant information from only features available at the lowest level, e.g., packet size, timing, and direction, in order to provide the widest range of applicability possible. It is to be appreciated that the present invention is not limited to the preceding specific information types and, thus, other information types can also be used, while maintaining the spirit of the present invention.

We propose a data-driven approach to deriving relevant information about HTTP traffic transmitted over encrypted channels. In particular, this information includes the network host to which the HTTP connection is directed (e.g., "www.IBM.com") as well as the path for the specific resource requested (e.g., "/bluepages/employee.php"). In order to derive this information for encrypted connections, we first extract the relevant information and pertinent features (packet size, timing and direction) from plaintext HTTP connections (the training corpus). We then build a model predicting the host and path information from individual HTTP request/response pairs based on the extracted features (which may be altered to mimic those of encrypted connections, e.g., by artificially padding packet sizes). Lastly, the model is used to predict host and path information for previously unseen encrypted connections. While described with respect to encrypted data, it is to be appreciated that the present principles are also readily applicable to unencrypted data and can thus predict host and path information for previously unseen unencrypted connections, while maintaining the spirit of the present principles. Thus, while the model is described as being built/trained using encrypted data, the model can also be built/trained using unencrypted data. These and other variations of the present principles are readily contemplated by one of ordinary skill in the art, given the teachings of the present principles provided herein, while maintaining the spirit of the present principles.

Our approach is general, in that it does not rely on a specific subset of the features mentioned above or on a particular modeling technique. However, for the sakes of illustration and clarity, in an embodiment, we propose the use of the following features:

sizes of the first n=5 packets in each direction;

total of packet sizes in each direction and in both directions; and total number of packets in each direction and in both directions. However, it is to be appreciated that embodiments of the present invention are not limited to solely the preceding features and, thus, other features can also be used, while maintaining the spirit of the present invention.

For the modeling portion, an embodiment of the present invention includes the use of random forests, a standard machine learning technique. In particular, we propose the use of a multi-label classification scheme, where each label is either a prefix of the path for a particular resource or a suffix of the full domain name (with or without the top level domain (TLD)). The models may be optimized, by cross-validation or resampling, for various multi-label classification metrics, including per-example precision, recall, accuracy and/or F-score, and per-label micro- or macro-averaged precision, recall, accuracy and/or F-score. Thus, in an embodiment, each example instance can have multiple labels. Moreover, in an embodiment, we can consider labels generated by the inclusion of sub-domains and resource paths.

Our approach includes two general stages. The first stage is the training stage, in which labeled data is collected and used to model HTTP request/response pairs. In an embodiment, the feature extractor first extracts post-encryption features (packet size, timing, and direction) and labeling information (host and resource path) from network traffic (either live or previously stored). These labeled instances (i.e., feature set and label set pair) are then sent to the modeling engine.

Either the feature extractor or the modeling engine may split the path and/or hostname into component labels based on a set of separating characters (e.g., the "." character for hostnames or the "/", "?", and "&" characters for resource paths), and may limit the set of resulting labels to a specific number of hostname and/or path labels.

The modeling engine trains a model to classify instances based on their label sets. For a random forest model, this includes learning a number of decision trees. For each tree, the learner selects a random subset of the training data and a random subset of the training instances over which to learn. The trees are collectively known as the random forest. A number of random forests may be learned with different parameters (parameters include the number of decision trees and the number of features used by each tree). The "best" random forest is then used for the prediction stage, where the "best" is determined by a multi-label classification metric (as mentioned above).

The prediction stage includes applying the model generated in the modeling stage to new data and passing the results of that application onto the analytics engine. The prediction engine accepts inputs in the form of features (packet sizes, timing, and direction), for individual HTTP request/response pairs. For each set of features, the prediction engine applies the model trained in the training stage to predict a set of labels, which is passed to the analytics engine. For a random forest model, this includes applying each individual decision tree to each set of features and counting the number of trees which output each set of labels. The set which the greatest number of tree outputs is given as the output label. The prediction engine may pass, instead of or in addition to the primary label, a ranking of possible labels and/or a mapping from real-valued weights to possible labels (e.g., probability estimates or raw vote counts).

The output of a random forest classification is generally the label with the highest number of "votes", where each individual tree which makes up the forest provides a single vote for a single potential label. Thus, the random forest can also output a list of potential labels ranked by the number of votes received for each label. These vote counts can be normalized to provide a likelihood estimate (a probability) for a given label.

Alternatively, the individual decision trees can assign weights which indicate the confidence of the tree in a label (or the entire set of labels) for a particular example. These weights can be aggregated (in a number of different ways) for each tree in the forest to provide global confidence values and/or likelihoods estimates for each potential label given an example.

It is to be appreciated that the present principles is not limited to the use of random forests and, thus, other machine learning techniques can also be utilized in accordance with the present principles, while maintaining the spirit of the present principles. That is, it is to be appreciated that while one or more embodiments of the present principles are described with respect to the use of a random forest(s), this and/or other machine learning techniques can be used to train the model and obtain predictions therefrom, while maintaining the spirit of the present principles.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a modeling engine for correlating detected packet traffic patterns, detected packet timing patterns, and detected packet size patterns of unencrypted data packets to at least a packet destination and a packet source of the unencrypted data packets to create at least one of a training corpus and a model built from the training corpus; and
   a memory for storing the at least one of the training corpus and the model,
   wherein the system further comprises a prediction engine for comparing observed packet traffic patterns, observed packet timing patterns, and observed packet size patterns of encrypted data packets to at least one of the training corpus and the model to classify the encrypted data packets with respect to at least one of a predicted network host and predicted path information for the encrypted data packets,
   wherein the at least one of the training corpus and the model is created using at least one random forest.

2. The system of claim 1, wherein the detected packet traffic patterns, the detected packet timing patterns, and the detected packet size patterns are altered to mimic corresponding features of encrypted data.

3. The system of claim 1, wherein the at least one of the training corpus and the model is created using a multi-label classification scheme with respect to the at least one random forest, where each label is a prefix of a path for a particular resource or a suffix of a domain name.

4. The system of claim 1, wherein the at least one random forest comprises a plurality of random forests each having different parameters respectively associated therewith, the method further comprises selecting a best random forest from among the plurality of random forests based on predetermined criteria, and wherein the best random forest is used to provide the at least one of the predicted host name and the predicted path information for the encrypted data packets.

5. The system of claim 4, wherein the predetermined criteria comprises selecting as the best random forest whichever one of the plurality of random forests has a greatest number of votes for a given label.

6. The system of claim 1, wherein the at least one of the predicted network host and the predicted path information is determined based on a ranking of possible labels for each of a plurality of input hypertext transfer protocol request and response pairs comprised in the encrypted data packets.

7. The system of claim 1, wherein the at least one of the predicted network host and the predicted path information is determined based on a mapping of real-valued weights to possible labels for each of a plurality of input hypertext transfer protocol request and response pairs comprised in the encrypted data packets.

8. The system of claim 1, wherein said modeling engine considers sub-domains and resource paths of the unencrypted data packets when performing the correlating.

* * * * *